(12) United States Patent
Silberstein et al.

(10) Patent No.: US 8,898,133 B2
(45) Date of Patent: Nov. 25, 2014

(54) USER BEHAVIOR-DRIVEN BACKGROUND CACHE REFRESHING

(75) Inventors: Adam Silberstein, Sunnyvale, CA (US); Ashwin Machanavajjhala, Baltimore, MD (US)

(73) Assignee: Yahoo! Inc., Sunnyvale, CA (US)

(*) Notice: Subject to any disclaimer, the term of this patent is extended or adjusted under 35 U.S.C. 154(b) by 95 days.

(21) Appl. No.: 13/332,340

(22) Filed: Dec. 20, 2011

(65) Prior Publication Data

US 2013/0159274 A1   Jun. 20, 2013

(51) Int. Cl.
*G06F 17/30* (2006.01)

(52) U.S. Cl.
USPC .......................................... 707/706

(58) Field of Classification Search
USPC ............ 707/706, 708, 721, 999.003; 711/106
See application file for complete search history.

(56) References Cited

U.S. PATENT DOCUMENTS

| | | | |
|---|---|---|---|
| 2002/0065920 A1* | 5/2002 | Siegel et al. | 709/227 |
| 2005/0188318 A1* | 8/2005 | Tamir et al. | 715/744 |
| 2007/0208983 A1* | 9/2007 | Sudhakar et al. | 714/732 |
| 2009/0070412 A1* | 3/2009 | D'Angelo et al. | 709/203 |
| 2009/0204753 A1* | 8/2009 | Bridge et al. | 711/106 |
| 2009/0265233 A1* | 10/2009 | Sendo et al. | 705/14 |
| 2010/0049608 A1* | 2/2010 | Grossman | 705/14.55 |
| 2010/0250735 A1* | 9/2010 | Andersen | 709/224 |
| 2010/0332513 A1* | 12/2010 | Azar et al. | 707/769 |
| 2011/0154223 A1* | 6/2011 | Whitnah et al. | 715/753 |
| 2011/0238754 A1* | 9/2011 | Dasilva et al. | 709/204 |
| 2011/0276396 A1* | 11/2011 | Rathod | 705/14.49 |

* cited by examiner

*Primary Examiner* — Mohammed R Uddin
(74) *Attorney, Agent, or Firm* — Martine Penilla Group, LLP

(57) ABSTRACT

Methods and system for providing social feeds from a plurality of third party sites to a user at a host site includes retrieving one or more access logs capturing online behavior of the user. The access logs are analyzed to determine the user's interactive behavioral pattern related to social feeds from each of the plurality of third party sites. A refresh schedule for the user is computed to refresh cache entries of social feeds at the host site based on the analysis of the user's online behavior at the social feeds. Cache entries of social feeds for the user are refreshed at the host site from the one or more of the plurality of third party sites at an allotted time specified by the refresh schedule.

20 Claims, 6 Drawing Sheets

USER BEHAVIOR-DRIVEN BACKGROUND CACHE REFRESHING

BACKGROUND

1. Field of the Invention

The present invention relates to Cache refresh, and more particularly, to background cache refresh of social data based on user behavior.

2. Description of the Related Art

The evolution of social interaction and social sites has brought about great changes in the way users interact. Some of the social sites have seen meteoric rise in the amount of interactive traffic while others have shown modest growth. Each of the social sites provides varied forms of interaction. A user having accounts in multiple social sites, such as Facebook, Twitter, etc., accesses the information by logging into these sites or subscribing for feed from these sites on a periodic basis. In order to reduce the burden on the users of visiting all the sites to get their social feeds periodically, some sites, such as Yahoo, provide options to the user to link his/her accounts from these third party sites, such as Facebook®, Twitter®, etc., to their Yahoo account so that the user can receive the "social feeds" from these third party sites in one place. The sites then present the feeds to the users with appropriate links. As a result, when a user accesses their default account (for e.g., Yahoo account), the user notices his/her social feeds or a list of events pertaining to their contacts in their social network in their default account obtained from the other third party sites.

One way sites, such as Yahoo, obtain the social feeds from the third party sites is by querying those sites when users arrive at the default account. The problem with this approach is that the third party sites may have erratic latencies, sometimes averaging between tens of milliseconds to tens of seconds. Such latencies delay the receiving of the social feeds thereby degrading user's social interaction experience leading to user's disinterest in the sites. To address the latencies, sites, such as Yahoo, maintain a local cache of social data (e.g., event feeds related to friends) gathered from the third party sites. In particular, the sites maintain a separate cache line for each (user, third party) pair where the user has linked their site account to the third party. The sites use and maintain this cache using a strategy known as "serve stale and refresh." According to this strategy, when a user arrives at the site and queries for the latest events pertaining to their social contacts, the site serves whatever is stored in cache for the (user, third party) pair, and asynchronously updates the cache line for this (user, third party) pair by simultaneously querying the third party site to refresh the cache so that subsequent requests of the feed are fresh.

There are some drawbacks with the "serve stale and refresh" strategy. For instance, this strategy is tied to a user's query pattern. As a result, the cache line may contain social data that may be very old and out-of-date. The cache line can be as old as the last time the user requested his/her feed that triggered a cache refresh. The last time the user requested the feed could range from few hours to few days. To avoid the staleness of the social data, one can proactively refresh the cache periodically. However, the proactive refresh may employ naïve strategies leading to wasteful resources and time.

It would be advantageous to employ a refresh strategy that utilizes optimal resources while providing a more up-to-date social data feed for a user in an efficient and effective way irrespective of when the user visited the site and requested the social data feed.

It is in this context that the embodiments of the invention arise.

SUMMARY

Embodiments of the present invention describe methods and systems for providing social feeds from a plurality of third party sites for a user, at a host site, using predictive refresh strategy. Using this strategy, a refresh algorithm is able to provide users with more current content to all the social feeds that a user has provided links from the host site, without imposing too much load on the resources at the host site or the third party sites. The algorithm is able to intelligently predict when users are most likely to generate subsequent requests for their social feeds by analyzing the users' online activity and perform refreshes to respective users' cache lines at the host site in the background based on the analysis. When the users subsequently request the social feeds, social feed data for the users are retrieved from the respective users' cache lines and presented to the users. Due to the refresh, the social feeds from the cache lines provide more current content. The algorithm thus is able to use the resources wisely by refreshing the respective users cache lines at specific periods that are most appropriate to each user's needs while balancing the load on the system resources using granular or weighted refresh schedules.

It should be appreciated that the present invention can be implemented in numerous ways, such as, methods and systems. Several inventive embodiments of the present invention are described below.

In one embodiment, a method for providing social feeds from a plurality of third party sites to a user, at a host site, is disclosed. The method includes retrieving one or more access logs of the user. The access logs capture the user's online behavior. The access logs are analyzed to determine the user's interactive behavioral pattern related to social feeds from each of the plurality of third party sites. A refresh schedule for the user to refresh cache entries of social feeds at the host site is computed based on the analysis of the user's online behavior related to the social feeds from the plurality of third party sites. The refresh schedule predicts the likelihood of receiving a refresh request from the user for one or more of the social feeds from one or more of the plurality of third party sites. The cache entries of social feeds for the user are refreshed at the host site from the one or more of the plurality of third party sites at an allotted time specified by the refresh schedule so as to maintain fresh social feeds for the user prior to receiving the user's subsequent request for the social feed.

In yet another embodiment, a method for providing social feeds from a plurality of third party sites to a user at a host site is disclosed. The method includes detecting the user's online activity related to the social feeds at the host site. The online activity identifies the interactive behavioral pattern of the user related to the social feeds from the plurality of third party sites. A refresh schedule to refresh cache entries of social feeds at the host site is generated for the user based on the user's online activity, wherein the refresh schedule spans multiple refresh cycles. The refresh schedule predicts a likelihood of receiving a subsequent request from the user for one or more of the social feeds from the plurality of third party sites. The cache entries of social feeds are refreshed at the host site, for the user, from the one or more of the plurality of third party sites at an allotted time specified in the refresh schedule so as to maintain fresh social feeds for the user prior to receiving the user's subsequent request for the social feed.

In yet another embodiment, a system for providing social feeds from a plurality of third party sites to a user at a host site is disclosed. The system includes a server equipped with a search engine and a refresh algorithm. The search engine is configured to query one or more third party sites and receive one or more social feeds from the one or more third party sites. The refresh algorithm includes a schedule builder and a schedule executor. The schedule builder is configured to retrieve one or more access logs of the user, wherein the access logs capture the user's online behavior; analyze the information within the access logs of the user related to the social feeds from the plurality of third party sites; and compute a refresh schedule for the user to refresh cache entries of social feeds at the host site based on the analysis, wherein the refresh schedule predicts a likelihood of receiving a subsequent request from the user for one or more of the social feeds from the one or more of the plurality of third party sites. The schedule executor is configured to refresh the cache entries of social feeds for the user at the host site from the one or more of the plurality of third party sites at an allotted time specified in the refresh schedule so as to maintain fresh social feeds for the user prior to receiving the user's subsequent request for the social feed.

The embodiments of the invention provide an efficient way for predicting when the users are likely to request social feeds from one or more of the third party sites and refresh cache lines for the respective users from the third party sites at appropriate times so as to be able to present the freshest social feed content to the users when the users request for the social feeds.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Broadly speaking, the embodiments of the present invention provide methods and systems to provide social feed updates from a plurality of third party sites, to a user at a host site. An algorithm, such as a refresh algorithm, executing on a server computing system retrieves user access logs of a user. The access logs keep track of the user's online behavior. The information in the access logs related to interactions with social feeds from a plurality of third party sites are analyzed and a refresh schedule is computed. The refresh schedule predicts a likelihood of when the user will likely request for subsequent social feed update. The refresh algorithm updates cache lines of the user with social feed updates from the third party sites at an appropriate time slot specified in the refresh schedule so that the user is presented with most current social feed data at the host site.

Figure 1:
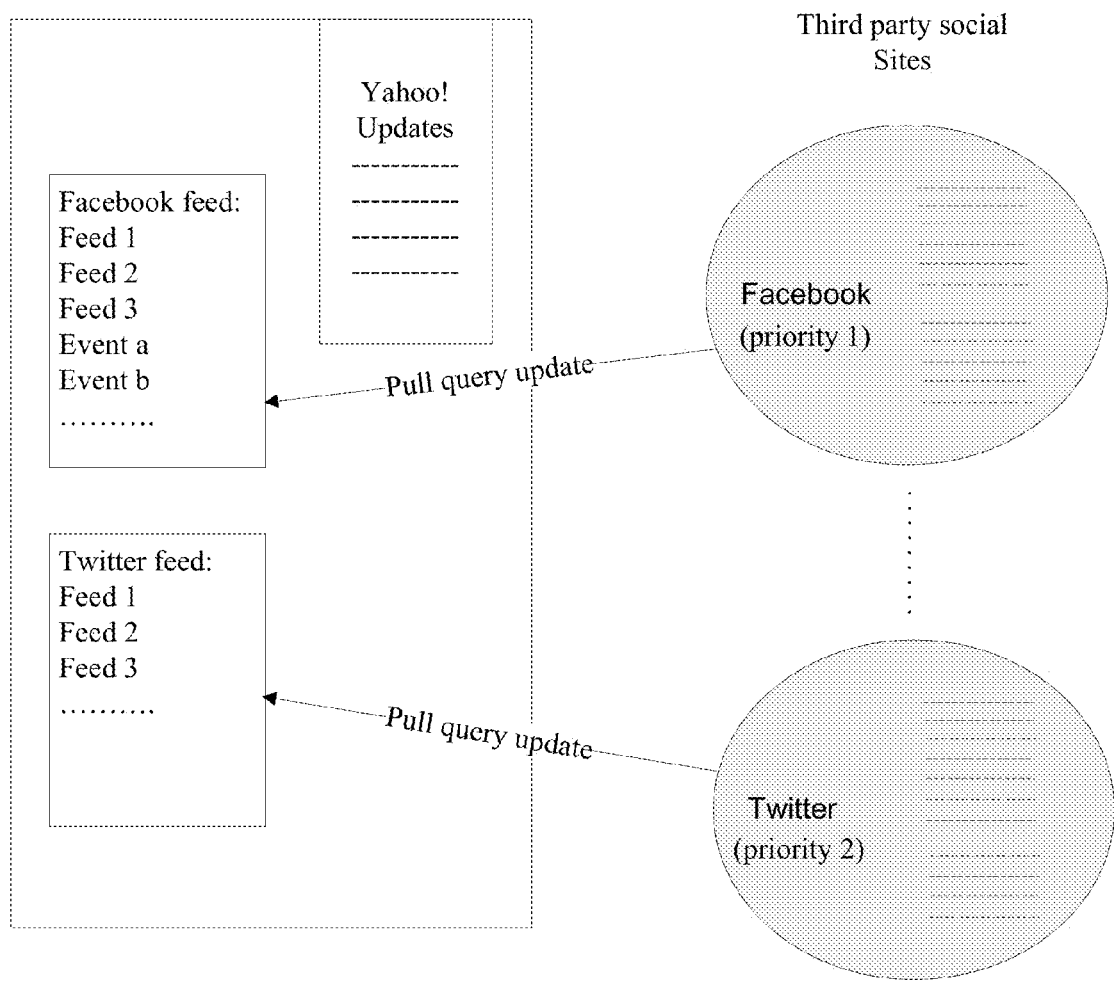
FIG. 1 illustrates a simplified sample webpage at a host site of a user identifying the third party social feeds that are linked to the webpage, in one embodiment of the invention.
Figure 2:
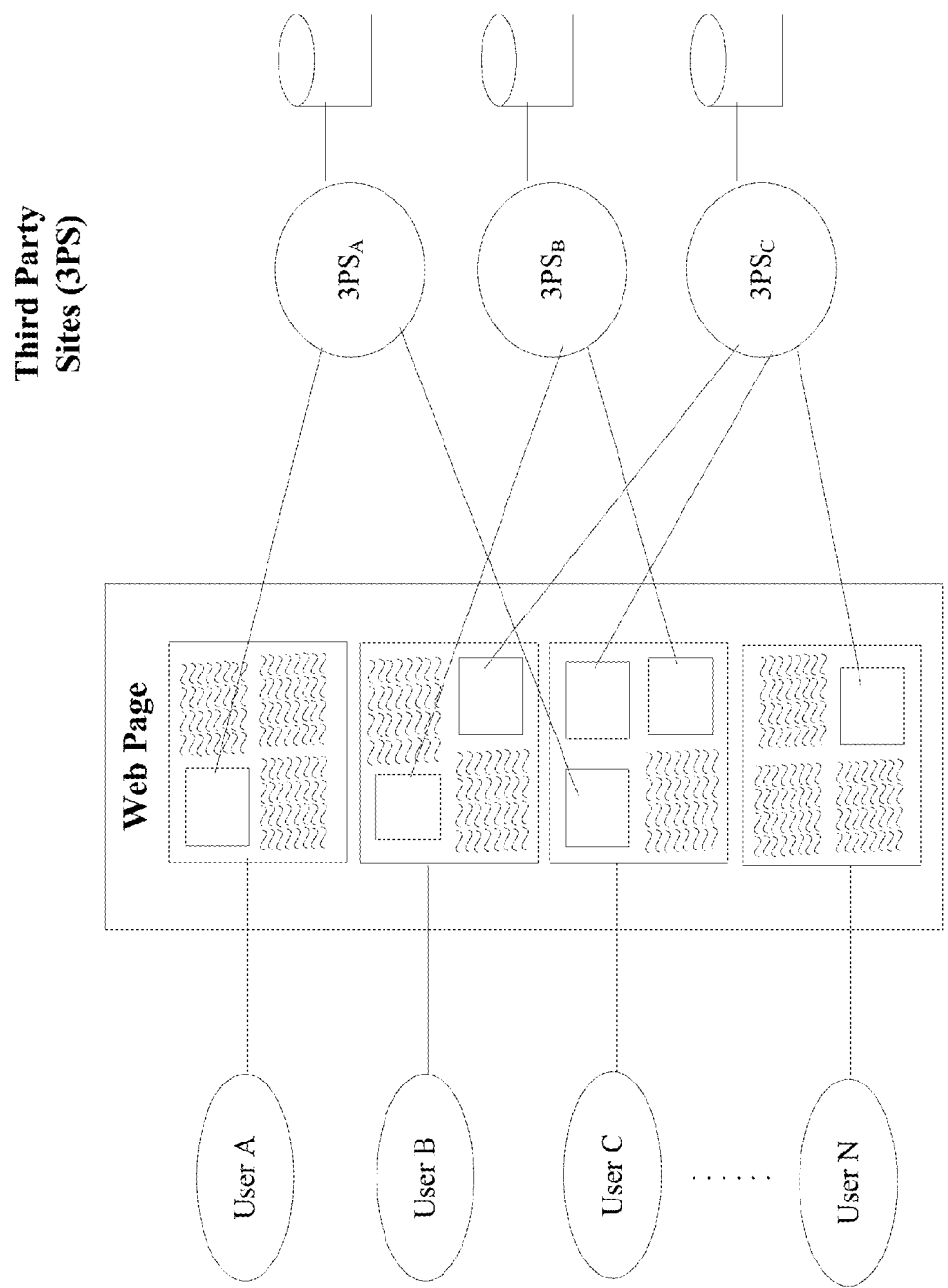
FIG. 2 illustrates simplified sample webpages of a plurality of users linking social feeds from a plurality of third party sites, in one embodiment of the invention.

With the brief overview, various embodiments of the invention will now be described in detail with reference to the figures. FIGS. 1 and 2 illustrate sample webpages that a user accesses to obtain social feed from a plurality of third party sites. As illustrated in FIG. 1, the sample webpage may be a host site webpage with links to social feeds from one or more third party sites. The third party sites may include Facebook®, Twitter®, Youtube®, etc., which provide periodic updates to a user from one or more of a user's social contacts. Each of the third party sites (3PS) have their own unique content and refresh priorities. The host site, such as Yahoo, allows a user to link the third party sites to a webpage, such as a Yahoo mail sign-on page, so that users can access the social feeds from the different third party sites from within the webpage at the host site. Further, the host site refreshes the social feeds at the host site from the third party sites by issuing periodic queries, such as "pull queries", and receiving the query updates in the form of social feed updates.

FIG. 2 illustrates webpages of a plurality of users. As illustrated in FIG. 1, each user may link one or more of his/her own third party accounts to their host site's webpage so as to receive social feeds at the host site. For instance, user A may include links for third party sites $3PS_A$ and $3PS_C$ in his webpage and receive social feed updates from third party sites A and C, user B may include link for third party site $3PS_B$ in his webpage and receive social feed updates from third party site B, user C may include links for third party sites, $3PS_A$, $3PS_B$ and $3PS_C$ and receive social feed updates from the third party sites A, B and C. In one embodiment, the webpage of the user at the host site may be a mail account webpage with links to the third party sites. In alternate embodiments, the webpage of the user may be a user generated webpage or may be a content page with or without user customizations. The host site may query each of the third party sites for which links are available in the webpage, as and when a user selects the respective links at the webpage and may receive social feed updates from the third party sites in response to the query.

Figure 3:
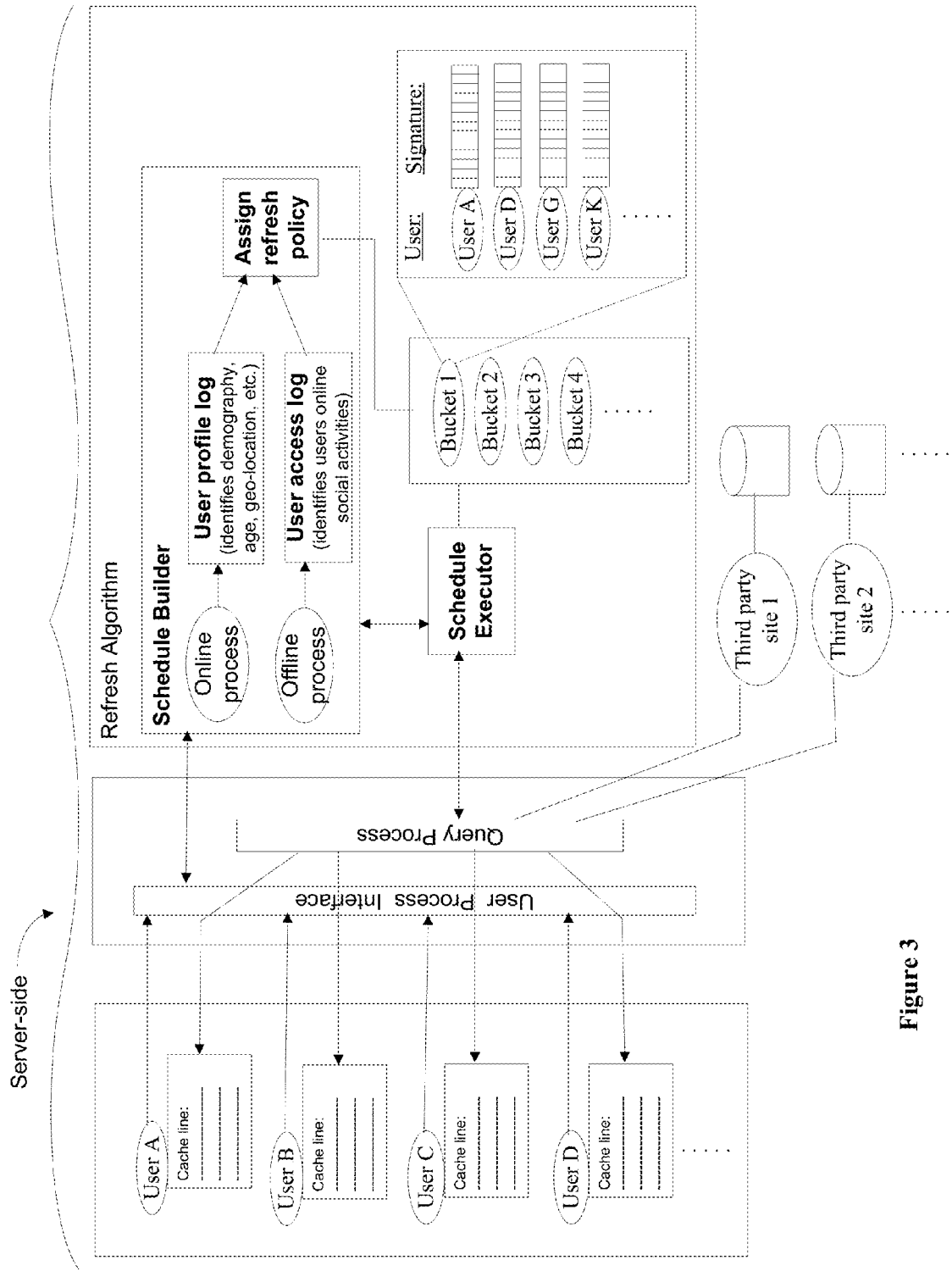
FIG. 3 illustrates an overview of a process flow through a system equipped with a refresh algorithm, in one embodiment of the invention.

FIG. 3 illustrates a process flow in providing a user with social feeds at a host site from a plurality of third party sites. As explained with reference to FIG. 2, a plurality of users link their third party accounts to their host site account/webpage so that access to the social feeds from the third party sites can be effectuated from the host site. An algorithm, such as a refresh algorithm is available at the host site to process the users' requests and to provide social feeds in a timely manner. The host site maintains cache lines to store social data from third party sites for all users. In particular, the host site maintains a separate cache line for each (user, third party site) pair at a host site server for every user who has linked the account at the host site to a third party site. When a user arrives at or accesses the host site account at a client device and queries for one or more social feeds, the query is transmitted to a user process interface on a server for further processing. For instance, a user accesses a mail account webpage at the host site wherein links to one or more of the third party sites are provided. As the user interacts with one or more links on the webpage, the interactions are captured and transmitted to the user process interface on the server. The interactions with the one or more links may be to view the social feeds from the one or more of the third party sites and/or request for new updates from the third party sites represented by the links. The user process interface verifies the authenticity of the user, identifies user interactions at the webpage and analyzes the user interactions to determine the nature and type of user's online activity with relation to the third party sites. Information related to the user interactions is captured in the user's access logs, information related to the user's profile is captured in the user's profile log and both of these logs are made available to the refresh algorithm. In one embodiment, a schedule builder module within the refresh algorithm analyzes the interactions from the access logs and generates a distinct refresh schedule for the user based on the analysis. The generated refresh schedule predicts when the user is likely to request social feed updates from the one or more third party sites. The schedule builder generates the refresh schedule by determining how often the user previously requested social feed updates from each of the third party sites and intelligently predicting when the user is likely to request subsequent social feed updates from each of the third party sites and generating the refresh schedule for the user accordingly. It should be noted herein that the refresh schedules for each of the third party sites for a user may be different. For example, a user may access his/her Facebook feeds more often than he accesses twitter feeds. As a result, the user's refresh schedule for Facebook feed updates may be more frequent than the twitter feed updates. The schedule builder takes into account the user's varying refresh needs from different third party sites when generating the refresh schedule for the user. The schedule builder also takes into consideration each third party site's refresh constraints when generating the refresh schedule for the user.

The schedule builder considers the varying granular requirement of the user for refreshing social feeds from the one or more third party sites and generates a signature for the user that encodes the user's access history. For example, a user requesting an hour granularity for a social feed from a particular third party site may have a signature that includes 24 bits, with each bit representing an hour. Thus, if a user accesses the social feed at a particular hour, that hour's bit in the user's signature is set to 1. For every hour in the day, the schedule builder will include the refresh schedules of the plurality of users whose corresponding hour's bit is set to one.

In another embodiment, instead of relying on the user's signature that encodes the user's online history, the schedule builder will analyze the user's profile from user profile logs to identify one or more attributes of the user. In this embodiment, the information in the profile logs are obtained from the user log data that captures user information along with user access information. The profile logs are stored separately from the access logs. Using the attributes of the user, the schedule builder may query and identify a refresh schedule associated with a plurality of users whose attributes match the attributes of the user and assign this refresh schedule for the user. In this embodiment, some of the user attributes that may be used in finding a match to the user profile include geo location, age, demography, etc.

Once the refresh schedule for a user is generated, the schedule builder assigns the refresh schedule to a proper execute bucket. The schedule builder first creates a plurality of execute buckets, Buckets 1, 2, 3, 4, . . . N, based on the granularity of refresh requested by a plurality of users that are specified in the respective users refresh schedules. The schedule builder then assigns the refresh schedule of the user into the appropriate execute bucket by parsing the signature, determining the bits that are set to one and generating an entry in the relevant execute bucket. As a result, each execute bucket includes entries associated with a plurality of users whose signature includes the bit related to execute bucket's allotted time slot set to one. As illustrated in FIG. 3, Bucket 1 includes entries related to refresh schedule of users A, D, G, K, etc., whose bit for a particular time slot relates to the allotted time slot of bucket 1 is set to one. Using signature with particular bits set to one or zero is one way of sorting the refresh schedule and refreshing the cache lines of a plurality of users. In one embodiment, instead of using bits, the signature can be generated by using weights. In this embodiment, the execute buckets may include the refresh schedule entries with weights that are above a threshold value or have a significant/valid value.

In one embodiment, in addition to creating execute buckets and assigning the refresh schedules into the appropriate execute buckets, the schedule builder may place priorities on each refresh request entry within the execute bucket based on the user's online activity. Upon placing priorities, the schedule builder sorts the entries in the execute buckets in decreasing order of priority. For example, if user A requests social feed update at 8:00 AM everyday and user B requests social feed update at 8:00 AM every other day, then user A is given higher priority/weight than user B by the schedule builder. In another embodiment, the schedule builder may sort the entries in the execute bucket in an order based on the weight specified in the signature of each user.

Using the information in the execute buckets, a schedule executor refreshes the cache lines of the respective users social feed from one or more of the third party sites at an allotted time specified for the execute bucket. The schedule executor acts like a proxy to the users and performs the cache line refresh of the social feeds from the third party sites, at the host site, based on the refresh schedules of plurality of users that have entries in the execute bucket. The schedule executor module relies on a timer module to keep track of the time so that the schedule executor can select the appropriate execute bucket to perform the cache line refreshes at allotted times. The schedule executor takes into consideration any refresh rate limits that exist at one or more of the third party sites while executing the refresh of the social feed cache lines for the user.

The schedule builder and schedule executor thus use the users' access logs to analyze users past behavior to try and predict when users are likely to request their social feed updates in the future. Retrieving of the access logs/profile logs of the users and analyzing of the logs are done by the schedule builder in an offline mode. The schedule builder then creates a per user signature that predicts when the respective users are most likely to request for their social feed update from each of the third party sites and formulate a refresh schedule so that the schedule executor can attempt to refresh the users' cache lines shortly before the users are predicted to arrive at the host site.

The embodiments of the invention can be extended to provide timely social feed updates in an online mode. In this embodiment, the schedule builder and schedule executor work in unison to provide a refresh schedule based on the user's online activity specified by the user's access to his/her account on the host site to which the user has linked one or more of the third party sites. The schedule builder detects the user's access, identifies one or more attributes of the user and the time period of access and generates a refresh schedule for refreshing the cache lines of social feeds from one or more third party sites for the user at the host site, which extends for a plurality of refresh cycles. The cache line refreshes are executed at the time slot specified by the original access. In this embodiment, a user who accesses his/her host site account periodically (for e.g., daily) at a particular time would have his refresh schedule specify cache line refreshes to be performed shortly before the time the user accessed his/her host site. This refresh schedule spans multiple cycles. For instance, if user A accesses social feeds at his host site account on Monday at 8:00 AM, the schedule builder will detect his access and generate future refresh schedules spanning Tuesday, Wednesday and Thursday (i.e. multiple refresh cycles) for executing shortly before 8:00 AM. The schedule executor will add the user A's refresh schedule entry into the appropriate execute bucket so that user A's cache line refreshes will be done just in time for the user A to access the most current social feed update when he accesses the social feeds from his host site account at 8:00 AM on Tuesday, Wednesday and Thursday.

Upon generating the refresh schedule for this user (i.e. user A), the schedule builder will continue to monitor the online activity of the user over the subsequent period to determine if the access pattern of the user for the social feeds remains the same or has changed. For example, from the above example, after generating the refresh schedule for user A for Tuesday, Wednesday and Thursday, the schedule builder will monitor the online activity of user A on Tuesday, Wednesday and Thursday to see if user A's access pattern related to social feeds stays the same or has changed. If the user's online access pattern remains the same, the schedule builder will continue to add additional refresh cycle periods for the user to occur at the same time. In the above example, if user A's access pattern has not changed from Monday to Wednesday, then the user A's refresh schedule will be extended to cover Friday and Saturday for 8:00 AM. If, however, the online access pattern of user A has changed on Tuesday and/or Wednesday, then the schedule builder detects the change and adjusts the refresh schedule accordingly.

Once the refresh schedules are sorted into appropriate execute buckets, the schedule executor will perform the cache line refreshes based on the refresh schedules identified by the entries in each execute bucket, at the allotted time. The performance of cache line refreshes for the plurality of users is carried out in an order specified within the execute bucket. For instance, the entries within the execute bucket are prioritized for execution (i.e. refreshing) based on the online activity of the user or based on relative weight specified in the users signature associated with the entries in the execute bucket.

The query process module receives the social feed updates from a plurality of third party sites for the plurality of users identified by the entries in the execute bucket and updates the respective cache lines of the plurality of users, as illustrated in FIG. 3. The cache lines of social feeds for the plurality of users are updated in time prior to receiving the predicted refresh request from the users so that the users may be presented with the updated social feeds in response to the request.

Figure 4:
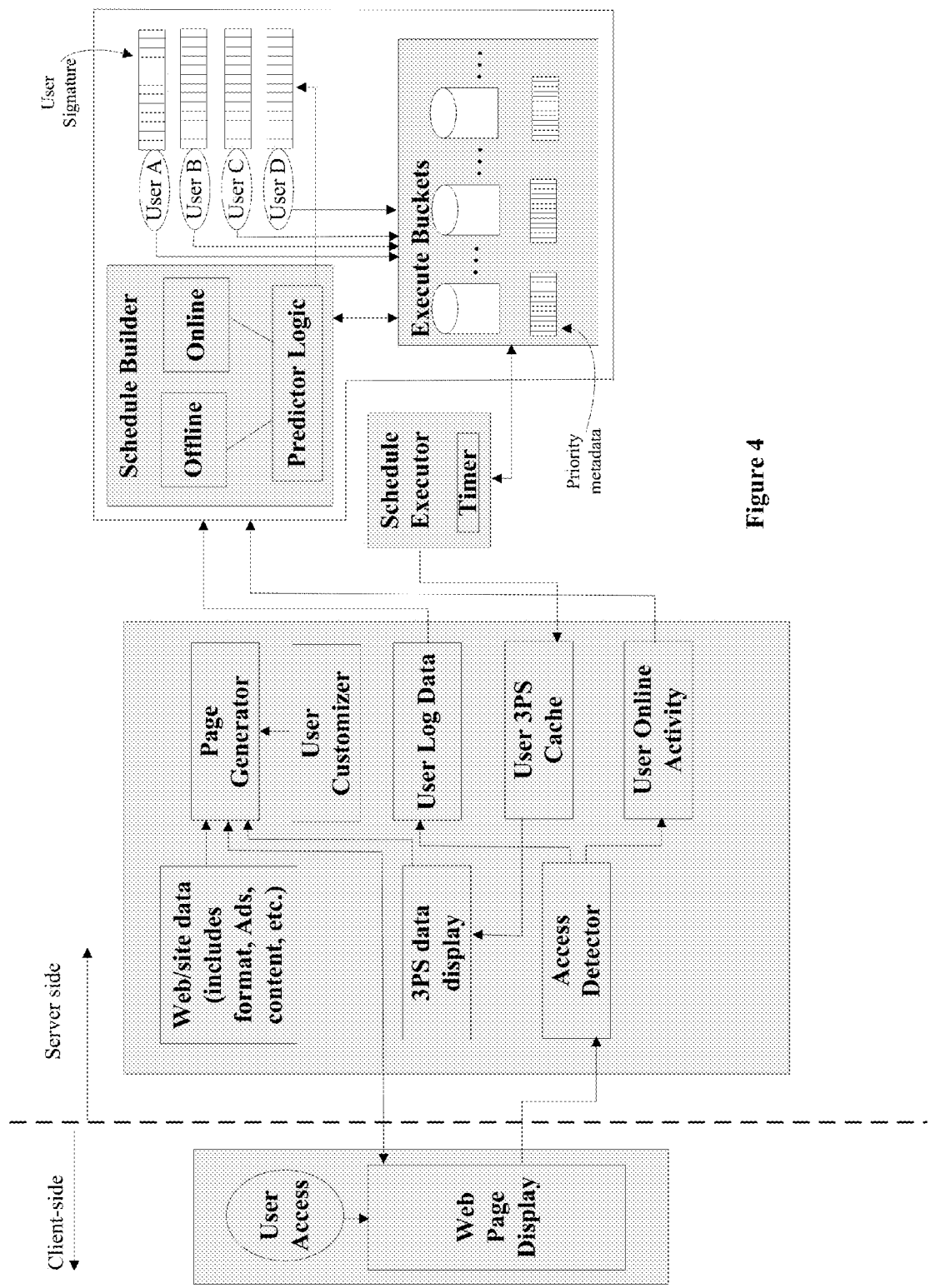
FIG. 4 illustrates an overview of various modules within a server used in the refreshing of cache lines of respective users with social feeds from a plurality of third party sites, in one embodiment of the invention.

FIG. 4 illustrates a system identifying various modules used in providing cache line refreshes of social data from a plurality of third party sites. The system includes a client-side device with a user interface that is used for accessing a user account and for rendering a webpage. The client-side device may be any type of computing device that is capable of interacting with a server to transmit user attributes from a user, receive content for a webpage from one or more content providers, over a network, and render the webpage at a display device associated with the client-side device. In one embodiment, the user arrives at a host site wherein a webpage associated with the user is rendered. In another embodiment, the user arrives at a host site and provides user credentials at a user interface on the client-side device to access the webpage associated with the user.

The user's access to the host site triggers a request for the webpage, which is forwarded to a server over a network, such as Internet. An access detector module detects the request from the user and updates the user's access log and online activity log. In addition, the access detector module keeps track of the user's activity at the portions/modules on the webpage (upon rendering) and stores the information related to the user's activity in the user access log data and user online activity. For instance, when a user accesses the webpage, the user access log data is updated with the user's information, such as user ID, webpage accessed, time of day the webpage was accessed, geo location of the user, age of the user, etc. Additionally, activities within the webpage, such as user clicks at particular links (i.e. social links) or modules, are recorded in the user's online activity log. A page generator module on the server receives the request for the webpage, queries the content providers and obtains web and/or site data from the content providers. The web data may include web feeds, RSS (Really Simple Syndication) feeds, etc., and site data may include format, content, ads, etc. The web/site data received from the content providers is assembled by the page generator module into a webpage. The assembled webpage may include user customizations provided through a user customizer module. The assembled webpage is returned to the client for rendering at the display device. Interactivity at the webpage is recorded in the user log data and user online activity through access detector module.

The user log data and the user online activity of the user are fed to the schedule builder as and when the schedule builder requests for the same. The schedule builder includes an online module and an offline module that are used to generate a refresh schedule for refreshing social feed cache lines for the user using an online or an offline mode strategy. A predictor logic within the schedule builder determines the mode strategy to use. For instance, when a user is a new user and does not have any activity recorded in the access/activity logs other than the initial login, the predictor logic may select online mode strategy. On the other hand, if the user has activities recorded in the access/activity logs, then the predictor logic may select the offline mode strategy.

When the mode strategy is offline, the predictor logic analyzes the user's access and activity logs to generate a unique signature for the user. The predictor logic may analyze the access/activity logs to determine the user's online and offline trends as well as the user's online behavior. For instance, the predictor logic may determine that a user, user A, is active online between 8:00 AM and 8:00 PM and is mostly offline between 8:00 PM and 8:00 AM every weekday and is active between 6:00 AM and 11:00 AM on weekends. Further, the predictor logic may determine that user A logs into his host site account with connected links to third party sites between 8:00 AM and 2:00 PM every weekday and randomly between 6:00 AM and 11:00 AM on weekends. The signature encodes the user's access history based on the online activity of the user in relation to each of the plurality of third party site links provided on the webpage captured in the user online activity module and user log data module. The access history includes the granularity desired by the user for refreshing each of the social feeds from the respective third party sites. For instance, a user may access his Facebook feeds every 30 minutes, his twitter account every 3 hours and Youtube® feeds every week. Based on the user's activity in relation to each of the social feeds, a signature is generated for the user reflecting the respective social feed's granularity desired by the user.

The schedule builder creates a set of execute buckets to cover the various granularity desired by a plurality of users. The schedule builder then assigns the refresh schedule of the user into appropriate one or more execute buckets based on the signature of the user. It should be noted that the user's signature may populate more than one execute bucket based on the granularity desired by the user for refreshing the social feeds from the different social sites. The assignment of the refresh schedule to one or more execute buckets leads to creation of a refresh entry in the respective one or more buckets. The entry identifies the refresh schedule of a particular user related to a particular third party site. The schedule builder generates a distinct priority metadata for each execute bucket. The priority metadata identifies the priority of each entry in the execute bucket based on the respective user's online behavior.

A schedule executor reads the information in the execute buckets and performs the cache line refreshes for each user as specified in the refresh schedule, at the allotted time. The schedule executor uses a timer module to track the time and to identify the appropriate execute bucket for performing the refreshes.

In one embodiment, during the refreshing phase, the schedule executor may not be able to complete the refreshing of the social feeds for all the users whose entries are in a particular execute bucket, within the allotted time. This might be due to the refresh putting a strain on the caching system and/or the third party sites. It might also be due to restrictions/refresh constraints placed by the third party sites. The schedule executor relies on the priority of the entries within the execute bucket to determine which entries to process and which ones to discard or move to a subsequent time slot. As illustrated in FIG. 4, the schedule executor obtains the priority information from the priority metadata created by the schedule builder and made available to the schedule executor for the entries in each execute bucket. As a result, when the schedule executor needs to select between any two users for refreshing the cache lines of social feed, the schedule executor will choose the entry related to a user whose priority is higher than the other user. For instance, if user A arrives at his host site webpage at 8:00 AM every day and user B arrives at his host site webpage at 8:00 AM every other day, and the executor has to select between entry associated with user A and entry associated with user B, the executor will select the entry associated with user A over the entry associated with user B.

The social feeds from the third party sites for the plurality of users are transmitted to the respective user's third party site (3PS) cache. When a user arrives at the webpage, the info from the user's 3PS cache is extracted for the user and accumulated into the 3PS data display module. The 3PS data display module assembles the social feed information and forwards the assembled data to the page generator. The page generator module integrates the 3PS data related to the social feeds for the user into the webpage and forwards the assembled webpage to the client device for rendering at the display device, in response to the initial request that was triggered by the user's arrival or access to the webpage. The schedule builder continues to track the interaction of the user at the rendered webpage, specifically as it relates to the social feeds from the third party sites and refines the refresh schedule of the user based on the online activity of the user with regard to the social feeds.

In another embodiment, the schedule builder may optimize on the number of social feed refreshes for a particular user based on information available in the social updates received for the user and revise the refresh schedule for the user accordingly. Thus, if the schedule builder determines that there is no new data in the data feed from a particular social site for the particular user, the schedule builder may leverage on this information and avoid refreshing the respective social feed for the user, thereby optimizing on the network resources. The schedule builder may determine with a high confidence level that there is no new data in a particular social feed since the last time the social feed was refreshed for the user, by analyzing the data obtained in the social feed for the social site and avoid refreshing the social feed during a subsequent refresh cycle. The schedule builder may perform this analysis by comparing the social feed data from the last refresh to the social feed data scheduled for the current refresh and determining that nothing has changed to the social feed since the last refresh. Armed with this information, the schedule builder may remove the social feed from the current execute bucket so that network and other resources are not unnecessarily consumed.

It should be noted herein that for a particular user, the social feeds from each of the social network may be a result of interactions by other users at the social network site and not necessarily based on interactions by the particular user. As a result, the user may not have any online activity to his credit for a certain time period but may have social feeds from social network sites due to the interactions by other users with whom the user has a social relationship. In other embodiments, the social feeds may be a result of interactions by other users and the particular user for whom the refresh schedule is being formulated.

The above embodiments provide a novel way of refreshing cache lines of social feeds from a plurality of third party sites that is better than the "serve stale and refresh" strategy used in conventional systems. The conventional systems served social feed information from the cache lines that were refreshed the last time the user accessed the site. The current embodiments, on the other hand, follow a fresh-hit-ratio approach (ratio of fresh to stale results) that depends completely on users' behavior. The freshness of the data can be increased by tuning fresh-hit-ratio based on the user's online behavior and limits imposed on the number of refreshes on the host site and the third party system. By intelligently selecting when to do refresh and for which users, the current embodiments are able to increase the fresh-hit-ratio at same or reduced cost.

The current embodiments can also be used to entice users who request the social feeds infrequently at the host site by allowing background refreshes to these users and presenting them with current social feed data whenever the users access the website thereby encouraging them to arrive at the host site more often.

Figure 5:
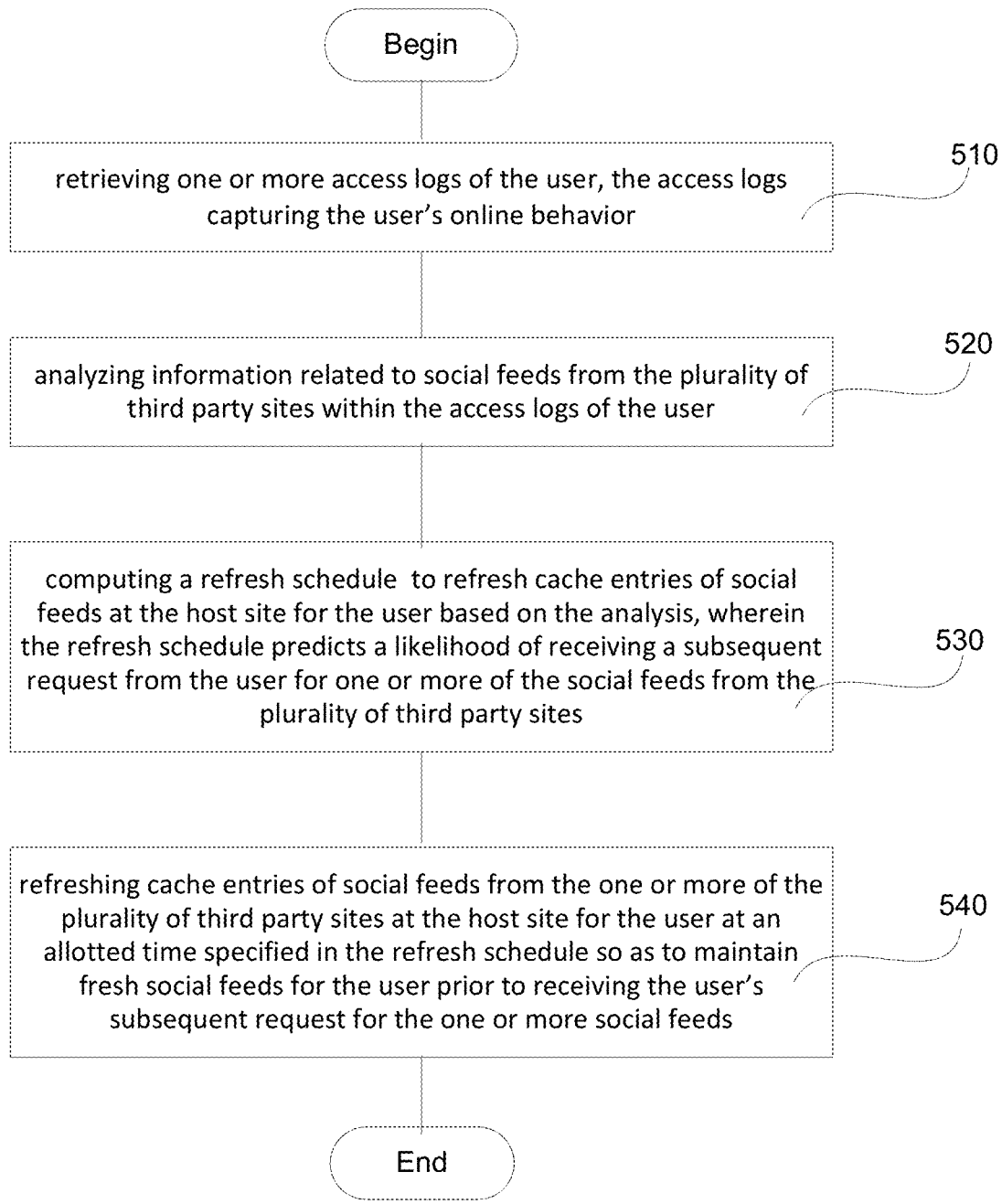
FIG. 5 illustrates a flow chart of process flow operations used by a refresh algorithm for providing social feeds from a plurality of third party sites, in one embodiment of the invention.

FIG. 5 illustrates a flowchart of process operations for a method used in providing social feeds to a user at a host site, in one embodiment of the invention. The method begins at operation 510, wherein one or more access logs of a user are retrieved by an algorithm, such as a refresh algorithm. The access logs capture the user's online behavior including activity related to one or more social feeds at a webpage on a host site. The user may have linked the one or more third party sites to the webpage on the host site and may access the social feeds from the third party sites using the links on the webpage. Information in the access logs of the user related to the social feeds is analyzed by the refresh algorithm, as illustrated in operation 520. A refresh schedule to refresh cache entries of social feeds from the one or more third party sites at the host site for the user is computed by the refresh algorithm, as illustrated in operation 530. The refresh schedule may be computed by generating a distinct signature for the user that captures the user's online interaction with the third party site links provided on the webpage at the host site. The refresh schedule is assigned to an execute bucket which includes matching refresh schedule entries from a plurality of users. The refresh schedule predicts the likelihood of receiving the user's subsequent request for the social feed updates at the webpage. The cache entries of the social feeds from the one or more third party sites are refreshed at the host site at an execute bucket's allotted time as specified in the refresh schedule, by the refresh algorithm, as illustrated in operation 540. The refreshed cache entries of the social feeds provide current social data information to the user when the user subsequently requests for the one or more social feeds at the host site. Upon presenting the up-to-date social feeds, the refresh algorithm may continue to monitor the user's online activity and behavior at the third party site links presented on the webpage at the host site and refine the refresh schedule of the user as and when appropriate. The above approach may be performed in an offline mode.

The cache entries are refreshed as near to the user's predicted time of request of the social feed as possible so that the user can be presented with the latest social feed updates as and when the user requires such feeds, enriching the user's interactive experience while greatly reducing the overhead associated with the random refreshes. Instead of refreshing periodically or serving stale data and then refreshing when a user requests for social data, the refresh algorithm predicts when the user is likely to request the social feeds and attempts to refresh just prior to the request from the user, making this a more efficient tool.

Figure 6:
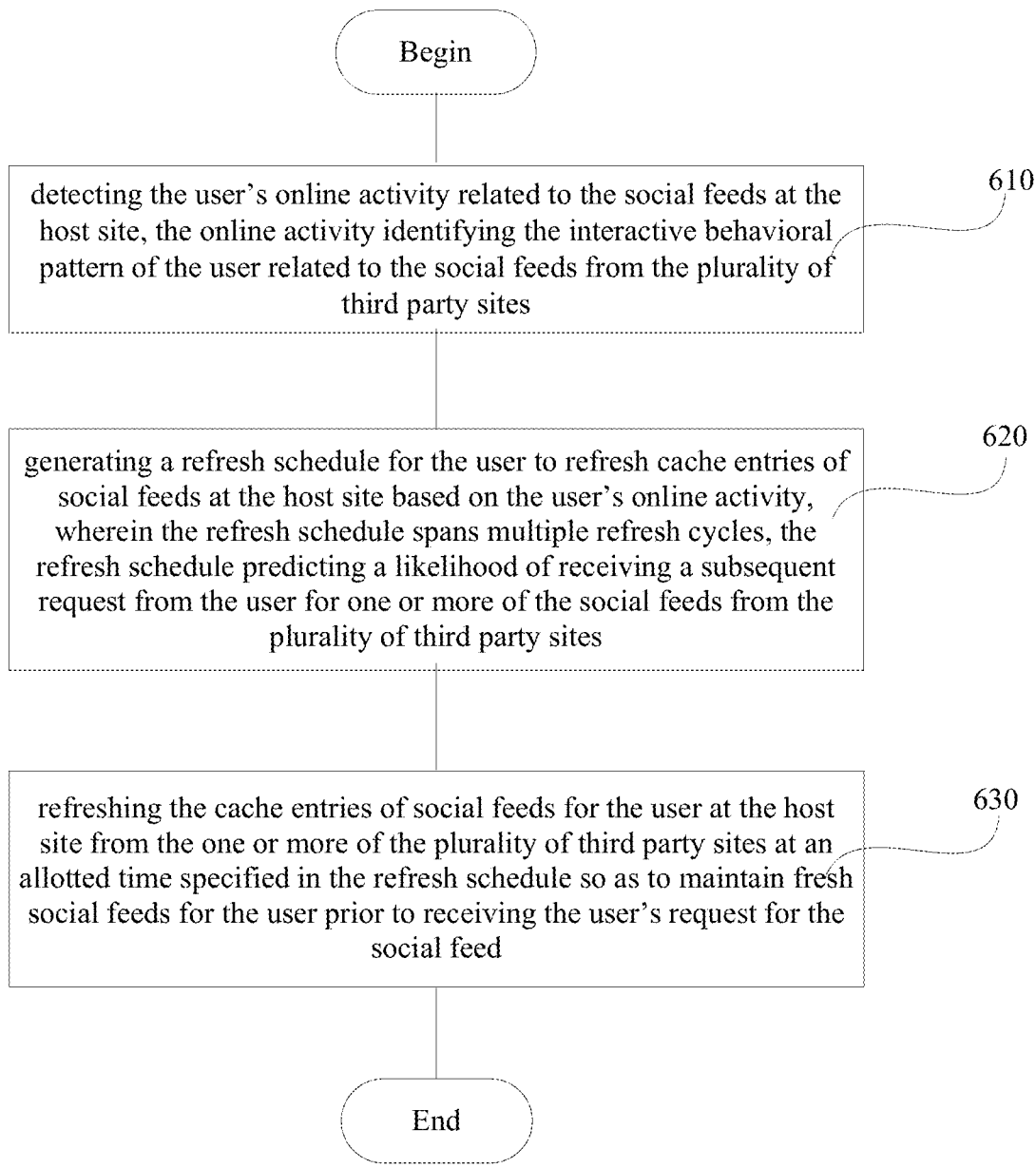
FIG. 6 illustrates a flow chart of various process flow operations used by a refresh algorithm for providing social feeds from a plurality of third party sites, in an alternate embodiment of the invention.

FIG. 6 illustrates process flow operations of a method for providing social feed from a plurality of third party sites at a host site, in an alternate embodiment of the invention. The method begins at operation 610 wherein a user's online activity related to the social feeds at the host site is detected by a refresh algorithm. The online activity identifies the interactive behavioral pattern of the user in relation to the social feeds from the plurality of third party sites. The refresh algorithm then generates a refresh schedule for the user to refresh cache entries of social feeds at the host site based on the user's online activity, as illustrated in operation 620. The refresh schedule covers a plurality of refresh cycles. The refresh schedule predicts the likelihood of receiving a subsequent request from the user for the social feed updates from the plurality of third party sites. The refresh algorithm then refreshes the cache entries of the social feeds for the user at the host site from the one or more of the plurality of third party sites at an allotted time specified in the refresh schedule, as illustrated in operation 630. The cache entry refreshes aid in maintenance of fresh social feed updates for the user so as to be able to present to the user fresh social feed updates from the third party sites in response to the user's subsequent request for the social feed. The social feed updates are refreshed into the respective user's cache lines in a timely manner based solely on the user's online behavior. The refreshes are done in the background asynchronously without imposing too much load on the host site's cache system or the third party sites. The algorithm addresses the disadvantages of prior approaches and erratic latencies of the third party sites by maintaining local cache lines for each (user, third party) pair and refreshing the social data in the cache lines just prior to the user's request for the updates.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing social feeds from a plurality of third party sites to a user at a host site, comprising:

retrieving one or more access logs of the user, the access logs capturing the user's online behavior;

analyzing information related to the social feeds from the plurality of third party sites within the access logs of the user;

computing a refresh schedule for the user to refresh cache entries of social feeds at the host site based on the analysis, the analysis identifying an access pattern established by the user for each of the social feeds, the refresh schedule predicting a likelihood of receiving a subsequent request from the user for one or more of the social feeds from the plurality of third party sites, the refresh schedule generating a signature for the user, the signature defining a refresh granularity to schedule refreshing of the cache entries, specific refresh granularities being set for each of the social feeds based on the refresh schedule predicting; and refreshing cache entries of social feeds from the one or more of the plurality of third party sites at the host site for the user, at a time specified in the refresh schedule so as to increase freshness of social feeds for the user in anticipation of receiving the user's subsequent request for the one or more social feeds, the time specified in the refresh schedule for each of the social feeds is prior to time of predicted receipt of the subsequent request of the respective social feeds such that the cache entries are refreshed in time of the predicted receipt of the subsequent request, wherein refreshing cache entries further includes prioritizing the cache entries based on the online behavior of the user such that the cache entries are refreshed in an order reflected by the prioritized cache entries, and wherein operations of the method are performed by a processor.

2. The method of claim 1, wherein analyzing further includes, determining the user's online behavior from the access logs to identify interactive behavioral pattern of the user related to social feeds from each of the plurality of third party sites.

3. The method of claim 2, wherein the signature encodes access history of the user based on the online behavior of the user in relation to each of the social feeds from the access logs.

4. The method of claim 1, wherein the signature generated for refreshing the cache entries reflects different refresh schedule for refreshing social feeds from different third party sites.

5. The method of claim 1, wherein computing a refresh schedule further includes, parsing the signature of the user to determine the desired refresh schedule;

creating an execute bucket for the time; and adding an entry of the refresh schedule of the user in to the execute bucket for the time, the execute bucket including entries of refresh schedules of a plurality of users with the refresh schedule matching the refresh schedule of the user.

6. The method of claim 5, wherein refreshing the cache entries further includes, prioritizing the refresh schedule entries within the execute bucket based on the online behavior of the respective users; and refreshing the cache entries of the users in the execute bucket in an order reflected by the prioritized refresh schedule entries.

7. The method of claim 5, wherein refreshing the cache entries further includes, when the refreshing is unable to complete all refresh schedules within the execute bucket at the time, moving the one or more refresh schedule entries left behind in the execute bucket to a second execute bucket that is scheduled for executing refresh at a subsequent time slot following the time, wherein the one or more refresh schedule entries discarded are of lower priority.

8. The method of claim 5, wherein refreshing the cache entries further includes, discarding one or more refresh schedule entries left behind in the execute bucket when the refreshing is unable to complete all refresh schedules within the execute bucket at the time, wherein the one or more refresh schedule entries discarded are of lower priority.

9. The method of claim 5, wherein refreshing the cache entries further includes, presenting the social feeds from the cache entries to the user upon request; and refreshing the cache entries of the social feeds of the user in the background upon presentation of the social feeds.

10. The method of claim 1, further includes, continuing to monitor the user's online behavior to one or more of the social feeds using the access logs; and refining the refresh schedule for the user based on the continued monitoring of the user's online behavior.

11. The method of claim 1, wherein the refresh schedule of the user is adjusted based on constraints of the one or more third party sites.

12. The method of claim 1, wherein analyzing further includes, determining one or more attributes of the user from information provided in the access logs;

classifying the user into a logical category associated with a plurality of users based on a match of the one or more attributes of the user with one or more attributes of the plurality of users.

13. The method of claim 12, wherein computing a refresh schedule for the user further includes, assigning a refresh schedule related to the logical category of the plurality of users whose attributes match the attributes of the user.

14. A method for providing social feeds from a plurality of third party sites to a user at a host site, comprising:

detecting the user's online activity related to the social feeds provided for the user at the host site, the online activity identifying the interactive behavioral pattern of the user in relation to the social feeds from the plurality of third party sites;

generating a refresh schedule for the user to refresh cache entries of social feeds at the host site based on the user's online activity, wherein the refresh schedule spans multiple refresh cycles, the refresh schedule predicting a likelihood of receiving a subsequent request from the user for one or more of the social feeds from the plurality of third party sites, the refresh schedule capturing refresh requirements for each of the plurality of third party sites, the refresh requirements for each of the plurality of third party sites being set to a refresh granularity; and refreshing the cache entries of social feeds for the user at the host site from the one or more of the plurality of third party sites at a time specified in the refresh schedule so as to increase a freshness of the social feeds for the user prior to receiving the user's request for the social feed, the time specified in the refresh schedule for receiving the social feed from each third party site is defined to be prior to time of predicted receipt of the subsequent request for the social feed such that the cache entries are refreshed in time of predicted receipt of the subsequent request for the social feed, wherein the refreshing of the cache entries further includes prioritizing the cache entries based on the interactive behavioral pattern of the user such that the cache entries are refreshed in an order reflected by the prioritized cache entries, and wherein operations of the method are performed by a processor.

15. The method of claim 14, further includes, monitoring the user's online activity with relation to each of the social feeds; and when the online activity of the user in relation to one or more of the social feeds changes, refining the refresh schedule of the one or more social feeds for the user to accommodate a change in the interaction by the user at the one or more of the social feeds.

16. The method of claim 15, wherein when the online activity of the user in relation to one or more of the social feeds remains unchanged,
  updating the refresh schedule of the one or more social feeds to include additional refresh cycles based on an analysis of the corresponding one or more social feeds, the analysis determining presence of updates to the corresponding one or more social feeds for the user.

17. A system for providing social feeds from a plurality of third party sites to a user at a host site, comprising:
  a server equipped with a search engine and a refresh algorithm, the search engine configured to query one or more third party sites and receive one or more social feeds from the one or more third party sites;
  the refresh algorithm executed by a processor of the server, the refresh algorithm includes a schedule builder and a schedule executor, the schedule builder configured to,
    retrieve one or more access logs of the user, wherein the access logs capture the user's online behavior;
    analyze the information within the access logs of the user related to the social feeds from the plurality of third party sites;
    compute a refresh schedule for the user to refresh cache entries of social feeds at the host site based on the analysis, the analysis identifying an access pattern established by the user for each of the social feeds, the refresh schedule predicting a likelihood of receiving a subsequent request from the user for one or more of the social feeds from the one or more of the plurality of third party sites;
    generate a signature for the user using the refresh schedule, the signature defining a refresh granularity to schedule refreshing of the cache entries, specific refresh granularities being set for each of the social feeds based on the refresh schedule prediction; and
  the schedule executor configured to refresh the cache entries of social feeds for the user at the host site from the one or more of the plurality of third party sites at a time specified in the refresh schedule so as to increase freshness of social feeds for the user prior to receiving the user's subsequent request for the social feed, the time specified in the refresh schedule for each of the social feeds is prior to time of predicted receipt of the subsequent request of the respective social feeds such that the cache entries are refreshed in time of the predicted receipt of the subsequent request, wherein the schedule executor is further configured to prioritize the cache entries based on the online behavior of the user such that the cache entries are refreshed in an order reflected by the prioritized cache entries.

18. The system of claim 17, further includes memory configured to:
  a. store signatures of a plurality of users, wherein the signature generated by the schedule builder encodes access history of the user in relation to the social feeds;
  b. store a plurality of execute buckets generated by the schedule builder to run at a specific allotted time, wherein each of the execute buckets including entries associated with the refresh schedule of a plurality of users; and
  c. third party site cache to store cache entries for the social feeds for the user received from one or more of the third party sites.

19. The system of claim 17, wherein the schedule builder includes predictor logic to analyze the online activity of the plurality of users and predict when each of the plurality of users will generate a subsequent request for the social feeds from one or more of the third party sites, the schedule builder is further configured to generate priority metadata for each user based on the online activity of the user in relation to the social feeds.

20. The system of claim 17, wherein the schedule executor includes a timer module to keep track of time for refreshing cache entries of social feeds for the user.

* * * * *